(12) United States Patent
Niu et al.

(10) Patent No.: US 9,370,018 B2
(45) Date of Patent: Jun. 14, 2016

(54) TECHNIQUES FOR UPLINK POWER CONTROL

(75) Inventors: Huaning Niu, Milpitas, CA (US);
Rongzhen Yang, Shanghai (CN);
Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/977,009

(22) PCT Filed: Jun. 8, 2012

(86) PCT No.: PCT/US2012/041709
§ 371 (c)(1),
(2), (4) Date: Jun. 27, 2013

(87) PCT Pub. No.: WO2013/048592
PCT Pub. Date: Apr. 4, 2013

(65) Prior Publication Data
US 2013/0272173 A1    Oct. 17, 2013

Related U.S. Application Data (60) Provisional application No. 61/542,086, filed on Sep. 30, 2011.

(51) Int. Cl.
*H04W 72/12* (2009.01)
*H04W 48/16* (2009.01)
(Continued)

(52) U.S. Cl.
CPC ......... *H04W 72/1215* (2013.01); *H04B 7/0456* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01);
(Continued)

(58) Field of Classification Search
CPC .. H04B 7/0456; H04B 7/0619; H04B 7/0613; H04L 5/0032; H04L 5/0037; H04L 45/245; H04L 47/41; H04L 12/189; H04L 25/0204; Y02B 60/50
USPC ........... 370/335, 331, 342; 455/63.1, 450, 62, 455/437, 114.2, 501, 10; 375/347, 148, 346
See application file for complete search history.

(56) References Cited

U.S. PATENT DOCUMENTS 6,954,637 B2 * 10/2005 Sasaki et al. .................. 455/423
8,576,733 B2 * 11/2013 Attar et al. .................... 370/252
(Continued)

OTHER PUBLICATIONS

International Search Report and Written Opinion, Mailed Date: Jan. 7, 2013, Application No. PCT/US2012/041709, Filed Date: Jun. 8, 2012, pp. 9.
(Continued)

*Primary Examiner* — Chandrahas Patel (57) ABSTRACT

Examples are disclosed for determining, at a base station, separate open loop power control factors for one or more uplink interference patterns based on received time division duplex configuration information received from one or more neighboring base stations. In some examples, the separate open loop power control factors may be communicated to wireless devices coupled with the base station. For these examples, the wireless devices may adjust transmit power controls responsive to receiving the separate open loop power control factors. Other examples are described and claimed.

18 Claims, 8 Drawing Sheets

*TDD Configuration Table 200*

| Uplink-Downlink Configuration | Downlink-to-Uplink Switch-Point Periodicity | Subframe Number |||||||||| 
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

*Portion 210*

| Uplink-Downlink Configuration | Downlink-to-Uplink Switch-Point Periodicity | Subframe Number |||||||||| 
|---|---|---|---|---|---|---|---|---|---|---|
| | | 0 | 1 | 2 | 3 | 4 | 5 | 6 | 7 | 8 | 9 |
| B.S. 122 (Config. 3) | 10 ms | D | S | U | U | U | D | D | D | D | D |
| B.S. 112 (Config. 4) | 10 ms | D | S | U | U | D | D | D | D | D | D |

Symmetric Uplink Interference Pattern 212
Asymmetric Uplink Interference Pattern 214

(51) Int. Cl.
| | |
|---|---|
| H04B 7/04 | (2006.01) |
| H04W 52/02 | (2009.01) |
| H04L 12/891 | (2013.01) |
| H04W 52/04 | (2009.01) |
| H04B 7/06 | (2006.01) |
| H04L 5/00 | (2006.01) |
| H04W 72/04 | (2009.01) |
| H04W 4/08 | (2009.01) |
| H04W 36/00 | (2009.01) |
| H04W 28/04 | (2009.01) |
| H04W 4/06 | (2009.01) |
| H04W 72/00 | (2009.01) |
| H04W 76/04 | (2009.01) |
| H04L 12/709 | (2013.01) |
| H04W 48/18 | (2009.01) |
| H04W 72/08 | (2009.01) |
| H04L 12/18 | (2006.01) |
| H04L 25/02 | (2006.01) |
| H04W 28/10 | (2009.01) |
| H04W 52/24 | (2009.01) |
| H04W 52/36 | (2009.01) |
| H04W 48/12 | (2009.01) |

(52) U.S. Cl.
CPC ......... *H04W 36/0005* (2013.01); *H04W 48/16* (2013.01); *H04W 48/18* (2013.01); *H04W 52/0235* (2013.01); *H04W 52/04* (2013.01); *H04W 72/005* (2013.01); *H04W 72/042* (2013.01); *H04W 72/082* (2013.01); *H04W 72/1278* (2013.01); *H04W 72/1294* (2013.01); *H04W 76/048* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 72/0426* (2013.01); *Y02B 60/50* (2013.01)

(56) References Cited

U.S. PATENT DOCUMENTS

| | | | |
|---|---|---|---|
| 8,687,484 B2 * | 4/2014 | Kim et al. ...................... 370/229 |
| 8,923,126 B2 * | 12/2014 | Wu et al. ....................... 370/235 |
| 2008/0064432 A1 | 3/2008 | Park et al. | |
| 2010/0296410 A1 | 11/2010 | Kazmi et al. | |

OTHER PUBLICATIONS

3rd Generation Partnership Project: Technical Specification Group Radio Access Network: Evolved Universal Terrestrial Radio Access (E-UTRA): Physical layer procedures (Release 10), 3GPP TS 36.213 v10.3.0, Sep. 27, 2011, pp. 9-18.

3GPP TSG-RAN1 #66, "Views of support of different TDD configuration in Rel-11", Pantech, Aug. 16, 2011, pp. 1-5.

Extended European Search Report received for European Patent Application No. 12835468.5, mailed Sep. 24, 2015, 6 pages.

Simonsson et al., "Uplink Power Control in LTE—Overview and Performance; Principles and Benefits of Utilizing rather than Compensating for SINR Variations", Ericsson Research, Vehicular Technology Conference, 2008, 5 pages.

"Uplink Power Control Discussion for CoMP Scenario 4", Intel, 3GPP TSG-RAN-WG1,#65, R1-111598, May 9-13, 2011, 16 pages, (author unknown).

"Individual Setting of UL Open-loop Power Control for Heterogeneous Networks with Shared Cell-ID", Alcatel-Lucent, 3GPP TSG-RAN-WG1,#66, R1-112423, Aug. 22-26, 2011, 5 pages (author unknown).

"3rd Generation Partnership Project; Technical Specification Group Radio Access Network; Physical layer procedures (TDD), (Release 10)", 3GPP TS 25.224, V10.3.0, (2011), 84 pages (author unknown).

* cited by examiner

*FIG. 1*

TDD Configuration Table 200

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Portion 210

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| B.S. 122 (Config. 3) | 10 ms | D | S | U | U | U | D | D | D | D | D |
| B.S. 112 (Config. 4) | 10 ms | D | S | U | U | D | D | D | D | D | D |

Symmetric Uplink Interference Pattern 212

Asymmetric Uplink Interference Pattern 214

RECEIVE TDD CONFIGURATION INFORMATION FROM ONE OR MORE NEIGHBORING BASE STATIONS
402

DETERMINE UPLINK INTERFERENCE PATTERNS BASED ON THE RECEIVED TDD CONFIGURATION INFORMATION
404

DETERMINE AN OPEN LOOP POWER CONTROL FACTOR FOR EACH DETERMINED UPLINK INTERFERENCE PATTERN
406

MEASURE NOISE POWER SPECTRAL DENSITIES FOR EACH UPLINK INTERFERENCE PATTERN TO DETERMINE THE OPEN LOOP POWER CONTROL FACTOR(S)
408

TRANSMIT UPLINK POWER CONTROL INFORMATION TO ONE OR MORE WIRELESS DEVICES COMMUNICATIVELY COUPLED TO THE BASE STATION
410

Storage Medium 600

*Computer Executable Instructions for 400*

*Computer Executable Instructions for 500*

TECHNIQUES FOR UPLINK POWER CONTROL

RELATED CASE

This application claims priority to U.S. Provisional Patent Application No. 61/542,086, filed on Sep. 30, 2011, the entirety of which is hereby incorporated by reference.

BACKGROUND

A same time division duplex (TDD) configuration may be implemented by a plurality of base stations in a typical wireless network. Implementing a TDD configuration at a base station may include using a downlink-to-uplink switch-point periodicity associated with a number of subframes. Possible interference patterns may be identified by the base station based on neighboring base stations for the wireless network implementing the same TDD configuration. Information to adjust uplink transmission power may be relayed to user equipment (UE) or wireless devices in communication with these base stations based at least in part on the identified interference patterns. Adjustments by a UE to uplink transmission power based on this information may be an important method to control or limit interference in a wireless network.

DETAILED DESCRIPTION

Examples are generally directed to improvements for wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The embodiments are not limited in this context.

By way of example and not limitation, various examples may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The embodiments are not limited in this context As contemplated in the present disclosure, adjustments to uplink transmission power may be important to limiting interference in a wireless network. Some industry standards such as those associated with 3GPP LTE-A utilize one or more transmit power control algorithms that may be implemented at an UE to adjust uplink transmission power. These transmit power control algorithms may depend on information received from a base station in communication with or associated with the UE. The information may include an open loop power control factor ($P_O$).

In some examples, a $P_O$ may be determined based on possible interference patterns associated with neighboring base stations implementing the same TDD configurations. However, wireless networks may implement different TDD configurations at neighboring base stations. For example, such an implementation may be present in a heterogeneous network including a picocell and its associated macrocell. The picocell may have UEs wanting more uplinks to share content such as streaming video compared to uplinks used by the macrocell. Implementing different TDD configurations at neighboring base stations may result in additional interference patterns. These additional interference patterns may be problematic to a base station determining a $P_O$ and may result in providing an inaccurate $P_O$ to UEs. Receipt of an inaccurate $P_O$ may result in a reduced ability of the UE to adjust its uplink transmission power in order to control or limit interference.

In some examples, techniques are implemented for determining, at a base station of a wireless network, separate open loop power control factors. For these examples, TDD configuration information may be received at the base station from one or more neighboring base stations. An open loop power control factor may be determined for each of one or more uplink interference patterns. The one or more uplink interference patterns may have been determined based on the received TDD configuration information and may include at least one asymmetric uplink interference pattern. According to some examples, uplink power control information may be communicated or transmitted to one or more wireless devices communicatively coupled to the base station. The uplink power control information may indicate the determined separate open loop power control factors for the one or more uplink interference patterns.

Figure 1:
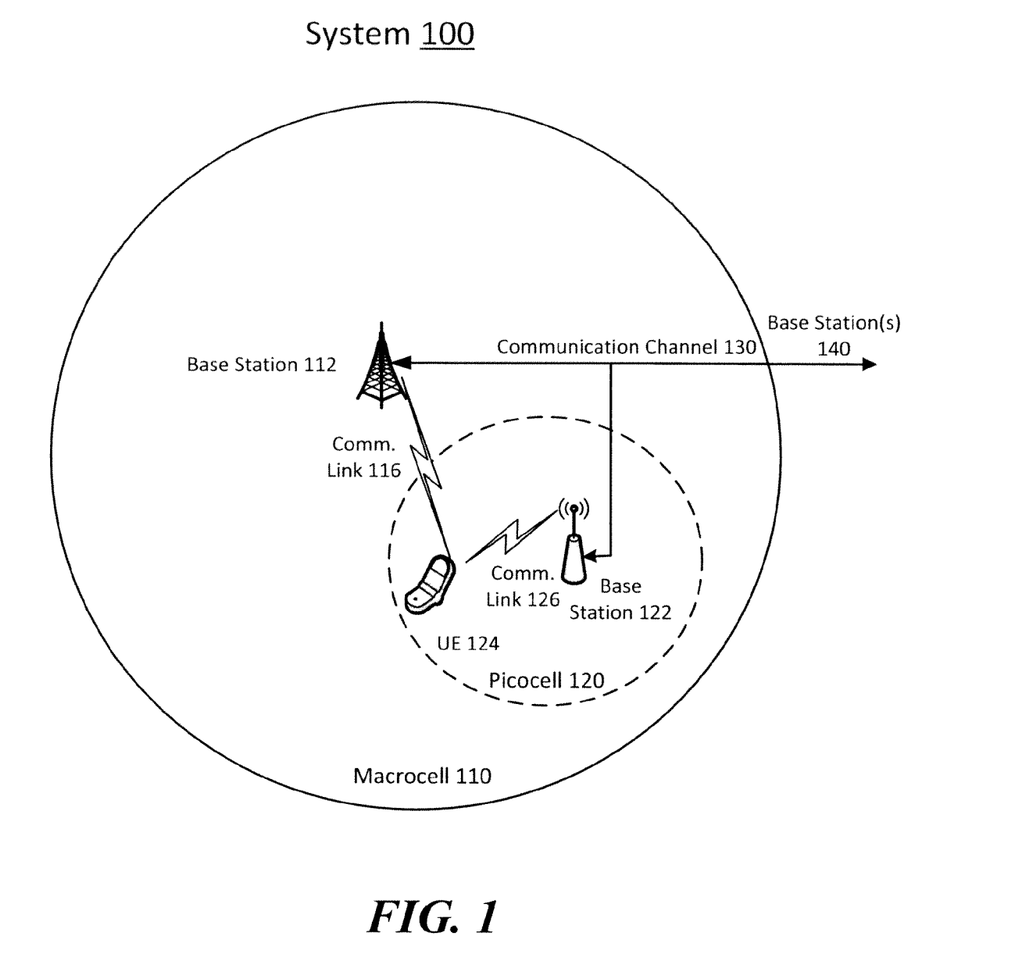
FIG. 1 illustrates an example of a system.

FIG. 1 illustrates an example of a system 100. In some examples, as shown in FIG. 1, system 100 includes a macrocell 110 and a picocell 120. For these examples, macrocell 110 and picocell 120 may be part of a heterogeneous wireless network deployment (e.g., HeNB) that may include base station 112 of macrocell 110 using a different TDD configuration than base station 122 of picocell 120. Also, as shown in FIG. 1, base station 112 and base station 122 may be communicatively coupled via communication channel 130. Communication channel 130 may also enable base station 112 and/or base station 122 to communicatively couple with neighboring base station(s) 140.

According to some examples, a wireless device such as user equipment (UE) 124 may receive communication signals from base station 122 via a wireless communication link depicted in FIG. 1 as communication or comm. link 126. UE 124 may also receive communication signals from base station 112 via another wireless communication link depicted in FIG. 1 as communication or comm. link 116. For these examples, UE 124 may be located within an area serviced by base station 122 for picocell 120 and thus may receive control information such as uplink power control factors from elements or devices maintained at base station 122 via comm. link 126.

In some examples, as described in more detail below, base station 122 may include logic and/or features arranged to receive TDD configuration information from at least base station 112. For these examples, the TDD configuration information may be received via communication channel 130. The logic and/or features at base station 122 may use the TDD configuration information to determine one or more uplink interference patterns and then determine an open loop power control factor for each of the one or more uplink interference patterns. The logic and/or features at base station 122 may then transmit uplink power control information to UE 124 to indicate the determined separate open loop power control factors for the one or more uplink interference patterns. According to some examples, UE 124 may adjust transmit power controls responsive to receiving the open loop power control information.

In some examples, although not shown in FIG. 1, other cells serviced by other base stations may be included within the area of macrocell 110. For example, a femtocell or microcell may exist within macrocell 110 and may also be interconnected with base stations 112 and/or 122 via communication channel 130 to exchange TDD configuration information in order to determine uplink interference patterns. These base stations may then disseminate uplink power control information to their associated UEs in a similar manner as described above for base station 122.

According to some examples, UE 124 may be any electronic device having wireless capabilities or equipment. For some examples, UE 124 may be implemented in a fixed device. For some examples, UE 124 may be implemented as a mobile device. A fixed device generally refers to an electronic device designed to be in a fixed, stationary, permanent or otherwise non-moving position or location that does not vary over time. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at base stations 112 or 122 may include system equipment, such as network equipment for a communications system or network compliant with one or more 3GPP LTE Specifications (e.g., LTE-A). For example, these base stations may be implemented as an evolved Node B (eNB) for a Wireless LTE network. Although some examples are described with reference to a base station or eNB, embodiments may utilize any network equipment for a wireless network. The examples are not limited in this context.

In some examples, communication channel 130 may include one or more communication links via which base stations 112, 122 and 140 may exchange information. The communication links may include various types of wired, wireless or optical communication mediums. For these examples, the communication links may be operated in accordance with one or more applicable communication or networking standards in any version. One such communication or networking standard may include 3GPP LTE-A and communication channel 130 may be arranged to serve as an X2 communication channel. According to some examples, logic and/or features at base stations 112, 122 and/or base station(s) 140 may include an X2 interface that allows for TDD configuration information to be exchanged between base stations 112, 122 and 140 via the X2 communication channel.

Figure 2:
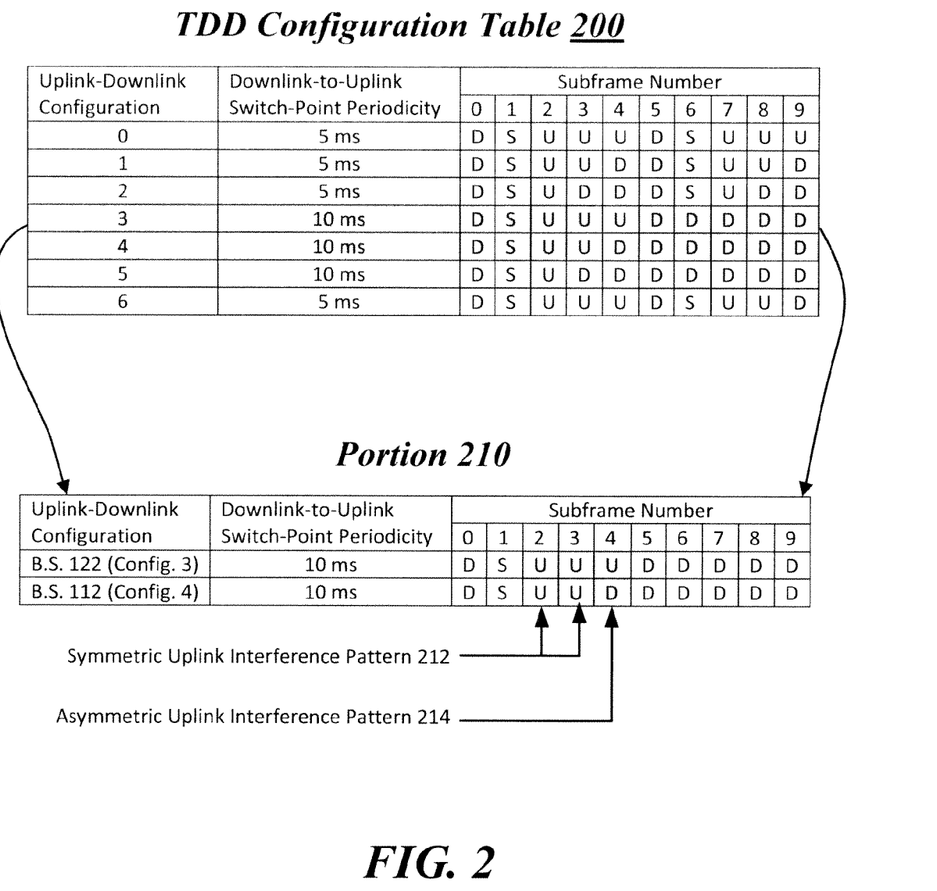
FIG. 2 illustrates an example of a TDD configuration table.

FIG. 2 illustrates an example of a TDD configuration table 200. In some examples, as shown in FIG. 2, TDD configuration table 200 may include uplink-downlink configurations 0-6 associated with subframes 0-9. For these examples, TDD configuration table 200 may be arranged according to the 3GPP LTE-A specification. This disclosure is not limited to only TDD configuration tables arranged according to the 3 GPP LTE-A. Other configuration tables are contemplated that may be used to indicate to neighboring base stations what TDD configuration is being implemented.

According to some examples, as shown in FIG. 2, downlink-to-uplink switch-point periodicities are indicated for each of the configurations. Also, for each of the subframes 0-9 a "D" may indicate downlink operations or transmissions at a base station, a "U" may indicate uplink operations or transmissions at a base station and an "S" may indicate special subframes.

In some examples, as shown in FIG. 2 for the shaded area of TDD configuration table 200 and for portion 210, base station 122 may be arranged to use configuration 3 and base station 112 may be arranged to use configuration 4. For these examples, from the perspective of base station 122, a symmetric uplink interference pattern 212 is shown as being associated with subframes 2 and 3. Also from the perspective of base station 122, an asymmetrical uplink interface pattern 214 is shown as being associated with subframe 4. According to some examples, subframes 2 and 3 are considered as symmetric since both configuration 3 and configuration 4 indicate uplink transmissions for these subframes. Meanwhile, for these examples, subframe 4 is considered as asymmetric because base station 122 using configuration 3 will be implementing uplink transmissions while base station 112 using configuration 4 will be implementing downlink transmissions.

According to some examples, as mentioned previously, base stations 112 and 122 may exchange TDD configuration information via communication channel 130. Base stations 112 and/or 122 may also exchange TDD configuration information with other base stations (e.g., included in base station(s) 140) via communication channel 130. The exchanged TDD configuration information with the other base stations may also be used by logic and/or features at base stations 112 or 122 to identify or determine uplink interference patterns.

Figure 3:
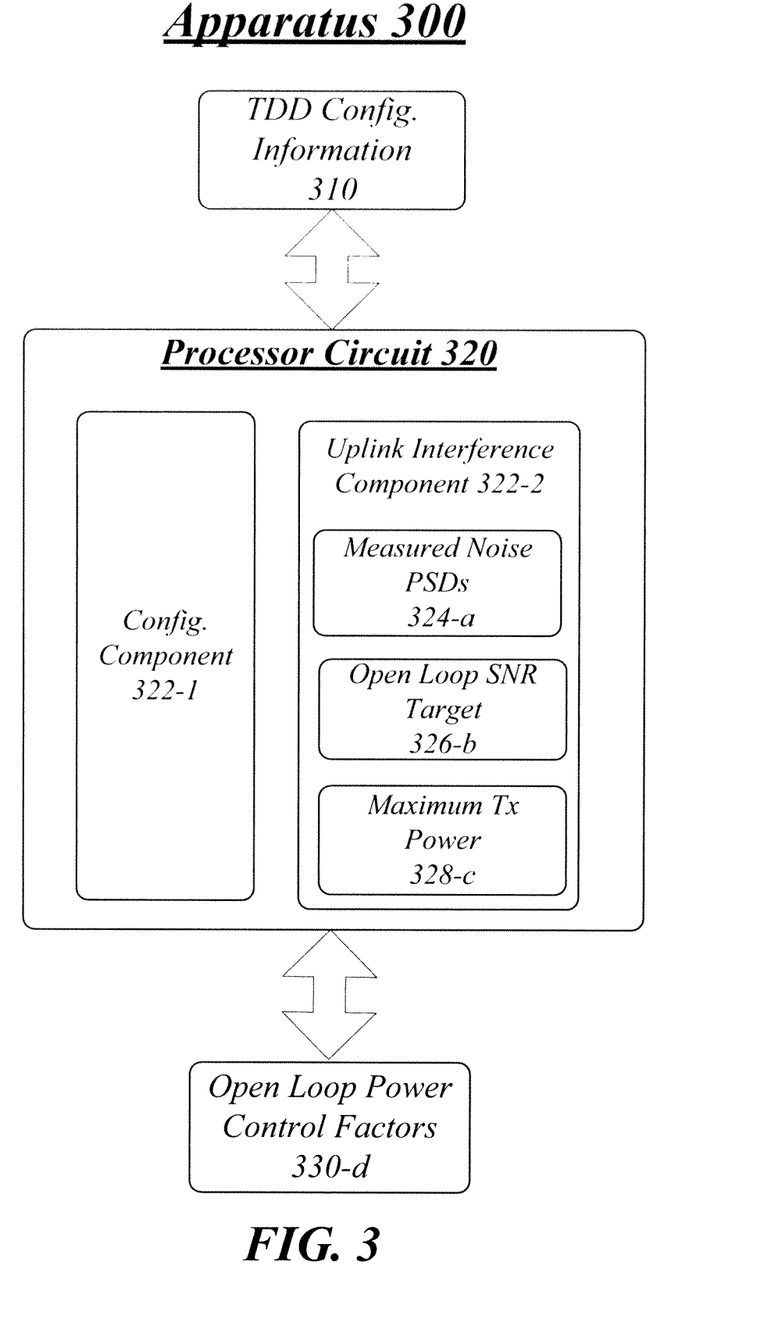
FIG. 3 illustrates an example block diagram for an apparatus.

FIG. 3 illustrates a block diagram for an apparatus 300. Although the apparatus 300 shown in FIG. 3 has a limited number of elements in a certain topology, it may be appreciated that the apparatus 300 may include more or less elements in alternate topologies as desired for a given implementation.

The apparatus 300 may comprise a computer-implemented apparatus 300 having a processor circuit 320 arranged to execute one or more software components 322-*a*. It is worthy to note that "a" and "b" and "c" and similar designators as used herein are intended to be variables representing any positive integer. Thus, for example, if an implementation sets a value for a=5, then a complete set of software components 322-*a* may include components 322-1, 322-2, 322-3, 322-4 and 322-5. The embodiments are not limited in this context.

According to some examples, apparatus 300 may be system equipment (e.g., located at or with base stations 112 or 122), such as network equipment for a communications system or network compliant with one or more 3GPP LTE Specifications. For example, apparatus 300 may be implemented as part of a base station or eNB for an LTE network. Although some examples are described with reference to a base station or eNB, examples may utilize any network equipment for a communications system or network. The examples are not limited in this context.

In some examples, as shown in FIG. 3, apparatus 300 includes processor circuit 320. The processor circuit 320 may be generally arranged to execute one or more software components 322-*a*. The processing circuit 320 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as the processing unit 320.

According to some examples, apparatus 300 may include a configuration (config.) component 322-1. Configuration component 322-1 may be arranged for execution by processor circuit 320 to receive TDD configuration information 310 from one or more neighboring base stations for a wireless network. As mentioned previously, base station 112, base station 122, or base station(s) 140 may exchange TDD configuration information via a communication channel such as communication channel 130 depicted in FIG. 1. In some examples, the wireless network and base station 112, base station 122, or base station(s) 140 may be arranged to operate in accordance with one or more 3GPP LTE Specifications such as those associated with LTE-A. For these examples, the TDD configuration information may be exchanged via an X2 communication channel. Other communication channels may be used and the examples are not limited in this context.

In some examples, apparatus 300 may also include an uplink interference component 322-2. Uplink interference component 322-2 may be arranged for execution by processor circuit 320 to determine an open loop power control factor for each of one or more uplink interference patterns. The one or more uplink interference patterns may be determined based on received TDD configuration information 310 from neighboring base stations. According to some examples, apparatus 300 may be located at or with base station 122 and the one or more uplink interference patterns may include patterns similar to symmetric uplink interference pattern 212 and asymmetric uplink interference pattern 214 mentioned above for FIG. 2.

According to some examples, uplink interference component 322-2 may determine open loop power control factors 330-*d* for symmetric/asymmetric uplink interference pattern(s) based at least in part on measured noise power spectral densities (PSDs) 324-*a*. For these examples, measured noise PSDs 324-*a* may include PSD measurements at a base station (e.g., base station 122) for each of the uplink interference patterns. For example, uplink interference component 322-2 may be arranged to measure separate PSDs for each uplink interference pattern due to a base station implementing either downlink transmissions while the measuring base station is implementing uplink transmissions (asymmetric) or the base station implementing uplink transmissions while the measuring base station is also implementing uplink transmissions (symmetric). Measured Noise PSDs 324-*a* may be at least temporarily stored in a data structure such as a lookup table (LUT).

In some examples, uplink interference component 322-2 may also determine open loop power control factors 330-*d* for the symmetric/asymmetric uplink interference pattern(s) based on additional inputs such as open loop signal-to-noise ratio (SNR) target 326-*b* and maximum transmit (Tx) power 328-*c*. For these examples, SNR target 326-*b* and maximum Tx power 328-*c* may be from the perspective of UEs (e.g., UE 124) associated with the base station (e.g., base station 122) that includes apparatus 300. SNR target 326-*b* and maximum Tx power 328-*c* may also be stored in a data structure such as an LUT.

According to some examples and as described in more detail below, determined open loop power control factors 330-*d* may be transmitted or communicated to UEs associated with a base station. The UEs may then adjust their respective transmit power controls responsive to receiving the determined open loop power control factors 330-*d*.

Various components of apparatus 300 and a device implementing apparatus 300 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 4:
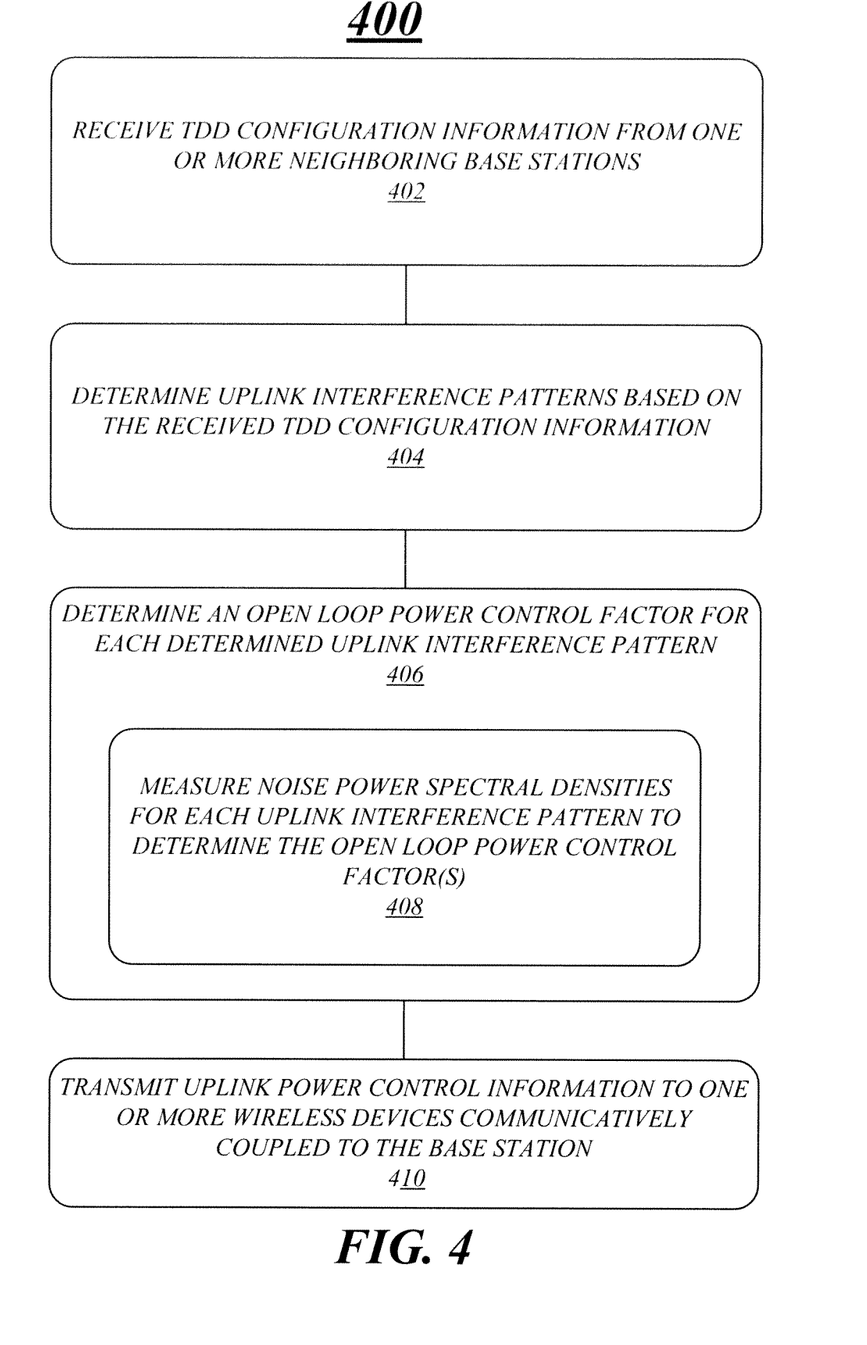
FIG. 4 illustrates an example of a first logic flow.

FIG. 4 illustrates an example of a logic flow 400. The logic flow 400 may be representative of some or all of the operations executed by one or more logic, features, or devices described herein, such as the apparatus 300. More particularly, the logic flow 400 may be implemented by configuration component 322-1 and/or uplink interference component 322-2.

In the illustrated example shown in FIG. 4, logic flow 400 may receive TDD configuration information from one or more neighboring base stations at block 402. For example, apparatus 300 may receive TDD configuration information 310 that may indicate at which subframe downlink or uplink transmissions are to occur for a frame associated with a wireless communication interface (e.g., an air interface). The TDD configuration information 310 may include an indication of which configuration (e.g., configuration 4) is being used by the one or more neighboring base stations from among the configurations shown in FIG. 2.

In some examples logic flow 400 at block 406 may determine uplink interference patterns based on the received TDD configuration information 310 at block 404. For example, base station 122 may include apparatus 300 and may be using configuration 3 as shown in FIG. 2. For these examples, the one or more neighboring base stations may include base station 112 that is using TDD configuration 4 as mentioned above. Uplink interference component 322-2 may then identify symmetric uplink interference pattern 212 and asymmetric uplink interference pattern 214.

According to some examples, logic flow 400 may measure noise PSDs for each uplink interference pattern to determine the open loop power control factor(s) at block 408. For example, uplink interference component 322-2 may use measured noise PSDs 324-$a$ to determine the open loop power control factors for both symmetric uplink interference pattern 212 and asymmetric uplink interference pattern 214. Uplink interference component 322-2 may also use open loop SNR target 326-$b$ and maximum Tx power 328-$c$ to determine the open loop power control factors.

In some examples, logic flow 400 may communicate or transmit uplink power control information to one or more wireless devices or UEs communicatively coupled to base station 122 at block 410. For example, a radio interface coupled to processor circuit 320 may communicate uplink power control information that includes open loop power control factors 330-$d$ determined by uplink interference component 322-2. A communication path or link such as communication link 126 between base station 122 and UE 124 as shown in FIG. 1 may be used to communicate or transmit the uplink power control information.

Figure 5:
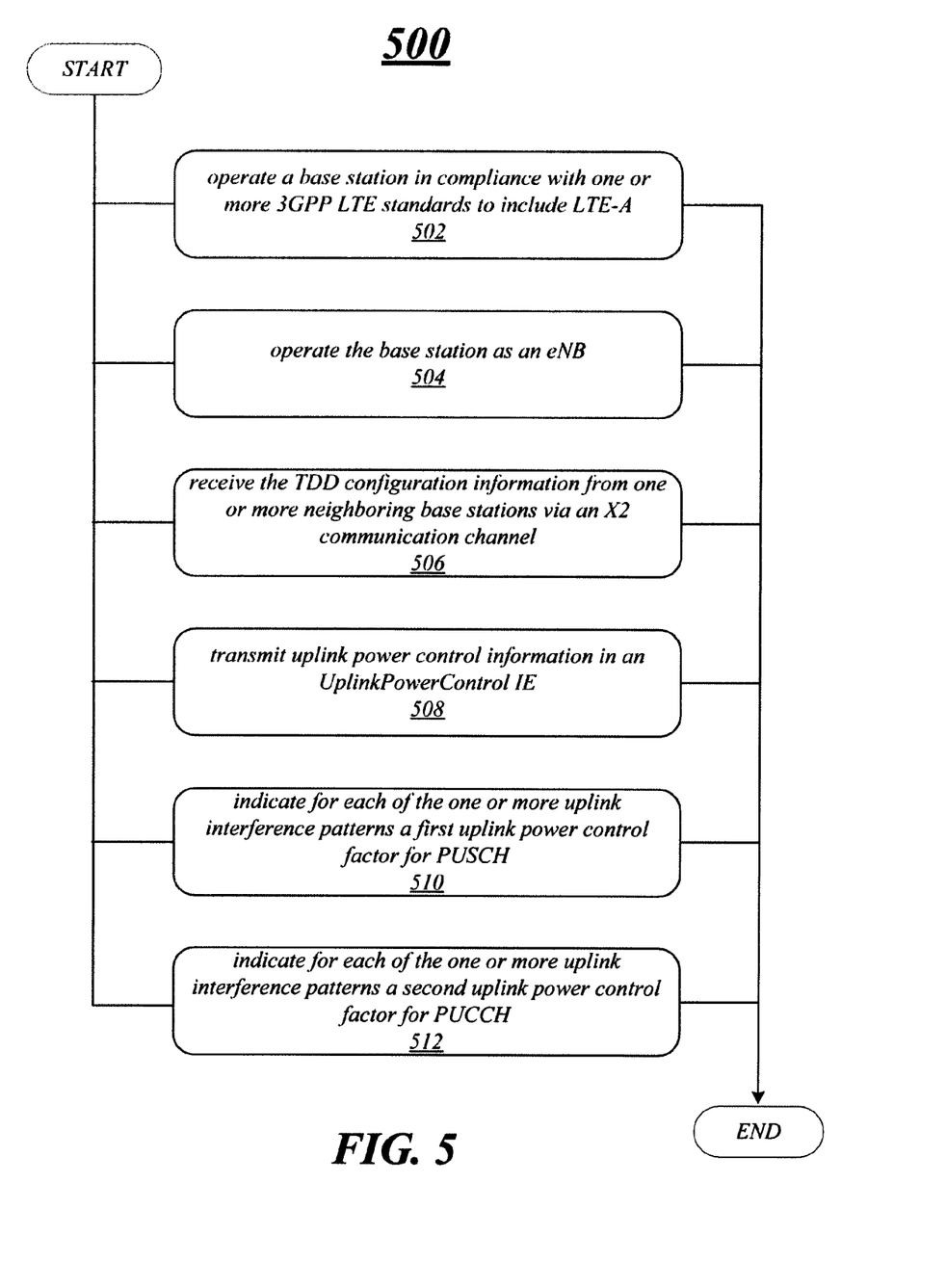
FIG. 5 illustrates an example of a second logic flow.

FIG. 5 illustrates an example of a logic flow 500. The logic flow 500 may be representative of some or all of the operations executed by one or more logic, features, or devices described herein, such as the apparatus 300. More particularly, the logic flow 500 may be implemented by configuration component 322-1 and/or uplink interference component 322-2.

In the illustrated example shown in FIG. 5, logic flow 500 may operate a base station in compliance with one or more 3GPP LTE standards or specifications to include specifications associated with LTE-A at block 502. For example, base station 112 and base station 122 may be arranged to operate in compliance with one or more specifications associated with LTE-A.

According to some examples, logic flow 500 may operate the base station as an eNB at block 504. For example, base station 122 may be arranged to operate as an eNB for picocell 120 as mentioned previously for FIG. 1. Also, base station 112 may be arranged to operate as an eNB for macrocell 110.

In some examples, logic flow 500 may receive TDD configuration information from one or more neighboring base stations via an X2 communication channel at block 506. For example, components of apparatus 300 at base station 122 such as configuration component 322-1 may receive TDD configuration information 310 from base station 112 via communication channel 130. For this example, as mentioned above for logic flow 400, uplink interference component 322-2 may determine uplink interference patterns based on the received TDD configuration information 310. Also as mentioned above for logic flow 400, uplink interference component 322-2 may also determine open loop power control factors for the uplink interference patterns based at least in part on measured noise PSDs 324-$a$. Uplink interference component 322-2 may also use open loop SNR target 326-$b$ and maximum Tx power 328-$c$ to determine the open loop power control factors.

According to some examples, logic flow 500 may transmit uplink power control information in an UplinkPowerControl information element (IE) at block 508. For these examples, the uplink power control information may include the open loop power control factors ($P_O$) for both symmetric and asymmetric uplink interference patterns.

In some examples, logic flow 500 may indicate for each of the one or more uplink interference patterns a first uplink power control factor for physical uplink shared channel (PUSCH) at block 510. For example, the first uplink open loop power control factors for PUSCH ($P_{O\_PUSCH}$) may reflect open loop power control factors that contain a fractional pathloss compensation. For these examples the $P_{O\_PUSCH}$ may be indicated to an UE (e.g., UE 124) in the UplinkPowerControl IE.

According to some examples, logic flow 500 may indicate for each of the one or more uplink interference patterns a second uplink power control factor for physical uplink control channel (PUCCH) at block 512. For example, the second uplink open loop power control factors for PUCCH ($P_{O\_PUCCH}$) may reflect open loop power control factors that contain a full pathloss compensation. For these examples the $P_{O\_PUCCH}$ may also be indicated to the UE (e.g., UE 124) in the UplinkPowerControl IE and logic flow 500 comes to an end.

In some examples, $P_{O\_PUSCH}$ and $P_{O\_PUCCH}$ may be indicated to the UE via a broadcast power control related message in an example UplinkPowerControl IE that includes uplink power control information as shown in Table I. This disclosure is not limited to this format.

TABLE I

UplinkPowerControlCommonCell - rxx :: =SEQUENCE{
    InterferencePatterns   String {size(8)}
    p0-NorminalPUSCH   SEQUENCE (SIZE(1~8)) of integer(−126..24)
    OPTIONAL
    alpha SEQUENCE (SIZE(1~8)) of ENUMERATED {al0, al04,
    al05, al06, al107, al09,al1}
OPTIONAL,
    p0-NorminalPUCCH   SEQUENCE (SIZE90~0-7)) OF
    INTEGER(126..24) OPTIONAL,
    ...
}

According to some examples, the UE may adjust transmission power controls responsive to receiving the UplinkPowerControl IE in the example format as shown in Table I. For these examples, the UE may be arranged to operate in compliance with one or more LTE-A specifications. In order to adjust transmission power controls the UE may implement algorithms as defined by the one or more LTE-A specifications for both $P_{O\_PUSCH}$ and $P_{O\_PUCCH}$. The algorithm for $P_{O\_PUSCH}$ may include example equation (1) as indicated below:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \quad (1)$$

Where:

$P_{O\_PUSCH}(j) + \alpha(j) \cdot PL$ is the open loop power control (OLPC) factor containing a fractional pathloss compensation.

$f(i) = f(i-1) + \delta_{PUSCH}(i - K_{PUSCH})$ is the closed loop power control (CLPC) factor.

$P_{CMAX}$ is the UE power limitation, $M_{PUSCH}(i)$ is the bandwidth multiply factor, $\Delta_{TF}(i)$ is the modulation and coding scheme (MCS) adjustment factor.

The algorithm for $P_{O\_PUCCH}$ may include example equation (2) as indicated below:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$

Where:

$P_{0\_PUCCH} + PL$ is the OLPC factor that support the full pathloss compensation;

$$g(i) = g(i-1) + \sum_{m=0}^{M-1} \delta_{PUCCH}(i - k_m)$$

is the CLPC factor.

$h(n_{CQI}, n_{HARQ}) + \Delta_{F\_PUCCH}$ (F) is the compensation for CQI/HARQ carry bits and different PUCCH uplink control information (UCI) format.

In some examples, the UE may include the inputs for $P_{O\_PUSCH}$ and $P_{O\_PUCCH}$ received in UplinkPowerControl IE when implementing example equations (1) and (2) in order to adjust uplink transmission power controls. The adjustment, for example, may reduce or control uplink interference. The uplink interference, for example, possibly caused by the base station that provided TDD configuration information 310.

Figure 6:
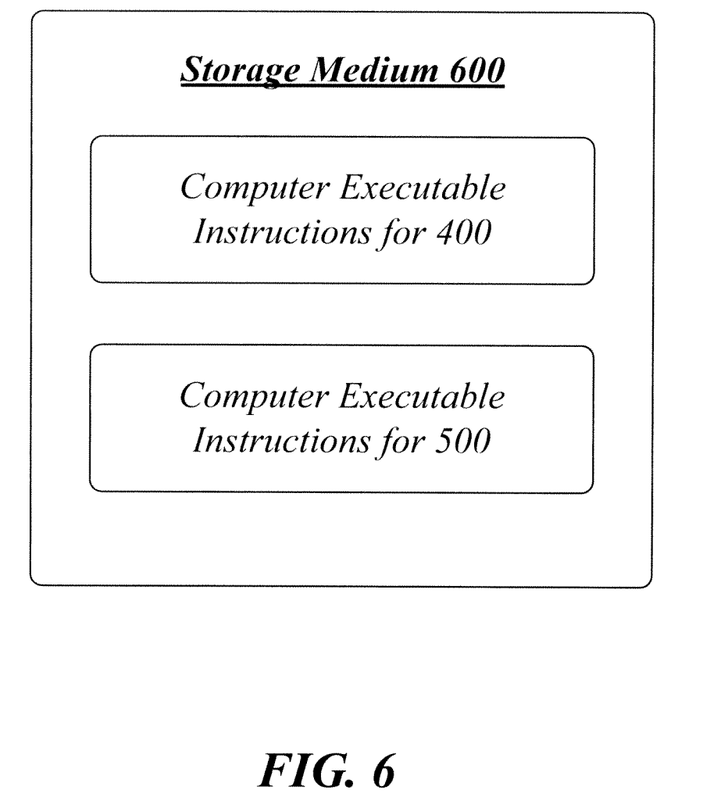
FIG. 6 illustrates an example of a storage medium.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement one or more of the logic flows 400 and/or 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
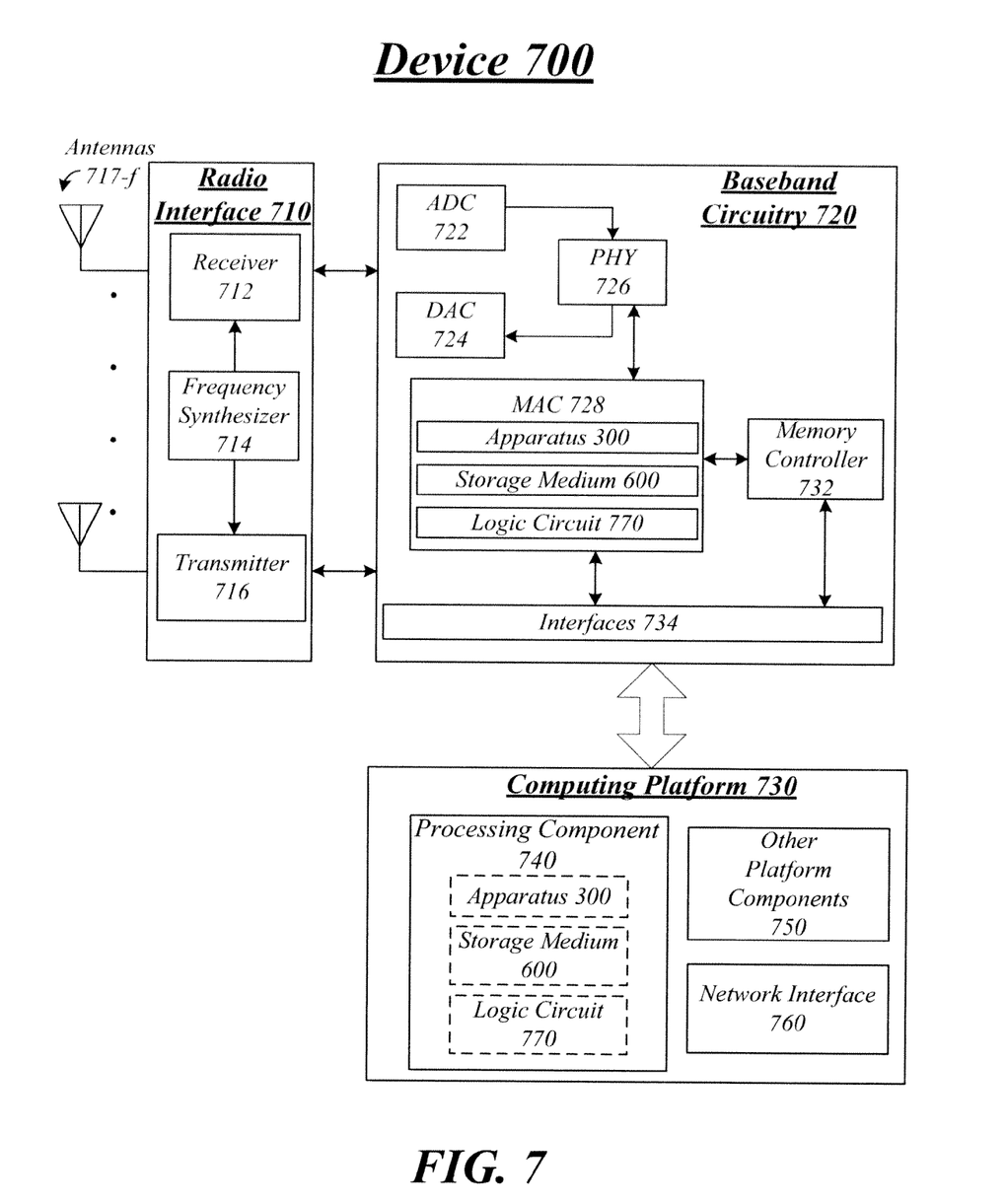
FIG. 7 illustrates an example of a communications architecture.

FIG. 7 illustrates an embodiment of a device 700 for use in a broadband wireless access network. Device 700 may implement, for example, apparatus 300, storage medium 600 and/or a logic circuit 770. The logic circuit 770 may include physical circuits to perform operations described for apparatus 300. As shown in FIG. 7, device 700 may include a radio interface 710, baseband circuitry 720, and computing platform 730, although examples are not limited to this configuration.

The device 700 may implement some or all of the structure and/or operations for the apparatus 300, storage medium 600 and/or logic circuit 770 in a single computing entity, such as entirely within a single device. Alternatively, the device 700 may distribute portions of the structure and/or operations for the apparatus 300, storage medium 600 and/or logic circuit 770 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 717-f. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with MAC processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 728 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for apparatus 300, storage medium 600, and logic circuit 770 using the processing component 730. Processing component 740 (and/or PHY 726 and/or MAC 728) may comprise various hardware elements, software elements, or a combination of both. Examples of hardware elements may include devices, logic devices, components, processors, microprocessors, circuits, processor circuits (e.g., processor circuit 320), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to support an X2 interface as described in one or more 3GPP LTE or LTE-A specifications or standards. For these examples, network interface 760 may enable an apparatus 300 located at a base station to communicatively couple to neighboring base stations via an X2 communication channel.

Device 700 may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 700 may be implemented using single input single output (SISO) architectures. However, certain implementations may include multiple antennas (e.g., antennas 717-f) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
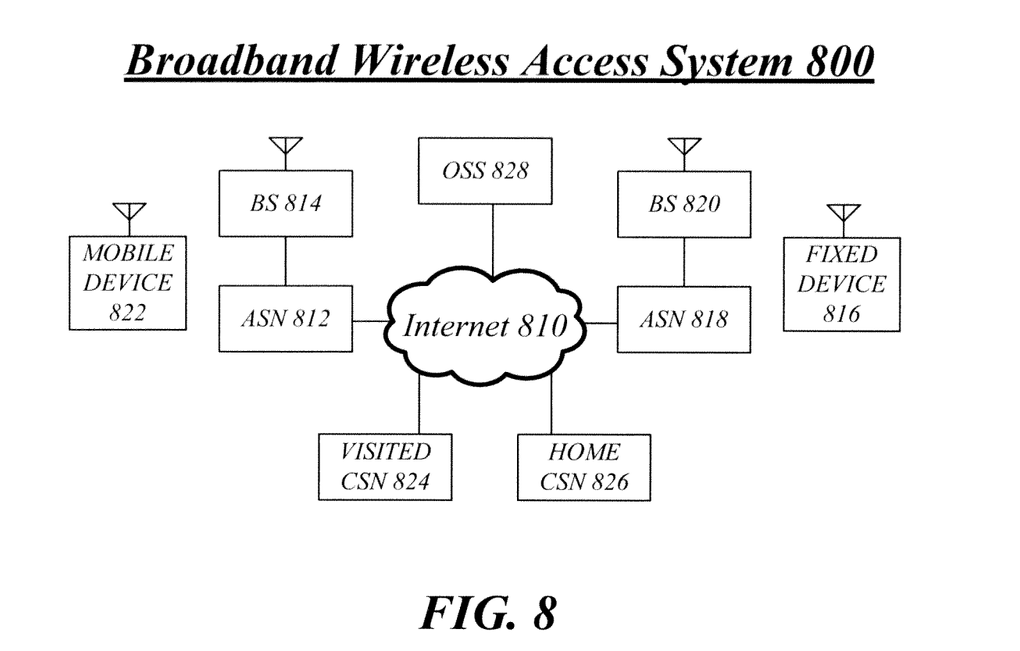
FIG. 8 illustrates an example of a communications system.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 812, 818 are capable of coupling with base stations (BS) 814, 820 (or eNBs), respectively, to provide wireless communication between one or more fixed devices 816 and internet 810, or one or more mobile devices 822 and Internet 810. One example of a fixed device 816 and a mobile device 822 is UE 124, with the fixed device 816 comprising a stationary version of UE 124 and the mobile device 822 comprising a mobile version of UE 124. ASN 812 may implement profiles that are capable of defining the mapping of network functions to one or more physical entities on broadband wireless access system 800. Base stations 814, 820 (or eNBs) may comprise radio equipment to provide RF communication with fixed device 816 and mobile device 822, such as described with reference to device 700, and may comprise, for example, the PHY and MAC layer equipment in compliance with a 3GPP LTE Specification or an IEEE 802.16 Standard. Base stations 814, 820 (or eNBs) may further comprise an IP backplane to couple to Internet 810 via ASN 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 824 may be referred to as a visited CSN in the case where visited CSN 824 is not part of the regular service provider of fixed device 816 or mobile device 822, for example where fixed 816 or mobile device 822 is roaming away from their respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations 814, 820, such as in or near a home or business to provide home or business customer broadband access to Internet 810 via base stations 814, 820 and ASN 812, 818, respectively, and home CSN 826. It is worthy to note that although fixed device 816 is generally disposed in a stationary location, it may be moved to different locations as needed. Mobile device 822 may be utilized at one or more locations if mobile device 822 is within range of one or both base stations 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, computer-implemented methods may include receiving, at a base station for a wireless network, time division duplex (TDD) configuration information from one or more neighboring base stations. An open loop power control factor may then be determined for each of one or more uplink interference patterns that were determined based on the received TDD configuration information. The one or more interference patterns may include at least one asymmetric uplink interference pattern. According to some examples, uplink power control information may be transmitted to one or more wireless devices communicatively coupled to the base station. The uplink power control information may indicate the determined separate open loop power control factors for the one or more uplink interference patterns.

According to some examples, the computer-implemented methods may also include the one or more wireless devices arranged to adjust respective transmit power controls responsive to receiving the uplink power control information.

In some examples, the computer-implemented methods may also include the TDD configuration information indicating respective downlink-to-uplink switch-point periodicity for the one or more neighboring base stations.

According to some examples, the computer-implemented methods may also include determining the open loop power control factor for each of the one or more uplink interference patterns based at least in part on a noise power spectral density (PSD) measured at the base station.

In some examples, the computer-implemented methods may also include operating the base station in a heterogeneous deployment scheme that includes the base station operative to serve as one of a microcell base station, a picocell base station, or a femtocell base station and the one or more neighboring base stations including a macrocell base station.

According to some examples, the computer-implemented methods may also include operating the base station in a homogeneous deployment scheme that includes the base station and the one or more neighboring base stations operative to each serve as a macrocell base station.

In some examples, the computer-implemented methods may also include operating the base station in compliance with one or more or more 3GPP LTE standards to include LTE-A. For these examples, base station may be operated as an eNB and the TDD configuration information may be received from the one or more neighboring base stations via an X2 communication channel. Also for these examples, the uplink power control information may be transmitted in an UplinkPowerControl Information Element (IE) that may indicate for each of the one or more uplink interference patterns a first open loop power control factor for Physical Uplink Shared Channel (PUSCH) and a second open loop power control factor for Physical Uplink Control Channel (PUCCH).

According to some examples, at least one machine readable medium comprising a plurality of instructions that in response to being executed on a computing device cause the computing device to carry out the example computer-implemented methods as mentioned above.

In some examples a communications device may be arranged to perform the example computer-implemented methods as mentioned above.

In some examples an apparatus or device may include means for performing the example computer-implemented methods as mentioned above.

According to some examples, an example first apparatus at a base station may include a processor circuit and a configuration component arranged for execution by the processor circuit to receive time division duplex (TDD) configuration information from one or more neighboring base stations for a wireless network. The device may also include an uplink interference component arranged for execution by the processor circuit to determine an open loop power control factor for each of one or more uplink interference patterns that were determined based on the received TDD configuration information, the one or more interference patterns to include at least one asymmetric uplink interference pattern.

In some examples for the example first apparatus, a radio interface may be coupled to the processor circuit to communicate uplink power control information to one or more wireless devices communicatively coupled to the base station. For these examples, the uplink power control information may indicate the determined open loop power control factor for each of the one or more uplink interference patterns.

According to some examples for the example first apparatus, the uplink power control information may cause the one or more wireless devices to adjust respective transmit power controls.

In some examples for the example first apparatus, the uplink interference component may be arranged to determine the open loop power control factor for each of the one or more uplink interference patterns based at least in part on a noise power spectral density (PSD) measured at the base station.

According to some examples for the example first apparatus, the base station may be arranged to operate as an eNB in compliance with one or more or more 3GPP LTE standards to include LTE-A. For these examples, an X2 interface coupled to the processor circuit may be arranged to receive the TDD configuration information from the one or more neighboring base stations via an X2 communication channel.

In some examples for the example first apparatus, a digital display may be coupled to the processor circuit to present a user interface view.

According to some examples, an example second apparatus at a base station may include means for receiving time division duplex (TDD) configuration information from one or more neighboring base stations for a wireless network. The example second apparatus may also include means for determining an open loop power control factor for each of one or more uplink interference patterns that were determined based on the received TDD configuration information. The one or more interference patterns to include at least one asymmetric uplink interference pattern.

In some examples, the example second apparatus may also include means for communicating the open loop power control factor for each of the one or more interference patterns to one or more wireless devices communicatively coupled to the base station. The open loop power control factor may cause the one or more wireless devices to adjust respective transmit power controls.

According to some examples, the example second apparatus may also include means for measuring a noise power spectral density (PSD) at the base station for each of the one or more uplink interference patterns and using the measured PSD to determine the open loop power control factor for each of the one or more uplink interference patterns.

In some examples, the example second apparatus may also include means for operating the base station as an eNB in compliance with one or more or 3GPP LTE standards to include LTE-A. This example second apparatus may also include means for communicating to the one or more neighboring base stations via an X2 communication channel in order to receive the TDD configuration information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, at an evolved node B (eNB), time division duplex (TDD) configuration information identifying a respective TDD configuration number for each of one or more neighboring eNBs;
determining open loop power control factors for each of one or more uplink interference patterns determined based on the received TDD configuration information, the one or more interference patterns to include at least one asymmetric uplink interference pattern; and
transmitting a power control message comprising an UplinkPowerControl information element (IE) to one or more wireless devices communicatively coupled to the eNB, the UplinkPowerControl IE to indicate, for each of the one or more uplink interference patterns, a first open loop power control factor for a Physical Uplink Shared Channel (PUSCH) and a second open loop power control factor for a Physical Uplink Control Channel (PUCCH).

2. The computer-implemented method of claim 1, the power control message to cause the one or more wireless devices to adjust respective transmit power controls.

3. The computer-implemented method of claim 1, the TDD configuration information to indicate respective downlink-to-uplink switch-point periodicity for the one or more neighboring eNBs.

4. The computer-implemented method of claim 1, comprising determining the open loop power control factors for at least one of the one or more uplink interference patterns based at least in part on a noise power spectral density (PSD) measured at the eNB.

5. The computer-implemented method of claim 1, comprising operating the eNB in a heterogeneous deployment scheme that includes the eNB operative to serve as one of a microcell eNB, a picocell eNB, or a femtocell eNB and the one or more neighboring eNBs including a macrocell eNB.

6. The computer-implemented method of claim 1, comprising operating the eNB in a homogeneous deployment scheme that includes the eNB and the one or more neighboring eNBs operative to each serve as a macrocell eNB.

7. At least one non-transitory machine readable medium comprising a plurality of instructions that in response to being executed on a computing device cause the computing device to carry out a method according to claim 1.

8. A communications device arranged to perform the method of claim 1.

9. The computer-implemented method of claim 1, comprising receiving the TDD configuration information from the one or more neighboring eNBs via an X2 communication channel.

10. An apparatus comprising means for performing the method of claim 1.

11. An apparatus for an evolved node B (eNB), comprising:
means for receiving time division duplex (TDD) configuration information identifying a respective TDD configuration number for each of one or more neighboring eNBs; and
means for determining a respective open loop power control factor for each of one or more uplink interference patterns based at least in part on respective noise power spectral density (PSD) measurements for each of the one or more uplink interference patterns, each of the one or more uplink interference patterns determined based on the received TDD configuration information, the one or more uplink interference patterns to include at least one asymmetric uplink interference pattern.

12. The apparatus of claim 11, comprising means for communicating uplink power control information to one or more wireless devices communicatively coupled to the eNB, the uplink power control information to indicate the respective determined open loop power control factor for each of the one or more uplink interference patterns, the uplink power control information to cause the one or more wireless devices to adjust respective transmit power controls.

13. The apparatus of claim 11, comprising means for communicating with the one or more neighboring eNBs via an X2 communication channel in order to receive the TDD configuration information.

14. An apparatus for an evolved node B (eNB), comprising:
a processor circuit;
a configuration component arranged for execution by the processor circuit to receive time division duplex (TDD) configuration information identifying a respective TDD configuration number for each of one or more neighboring eNBs; and
an uplink interference component arranged for execution by the processor circuit to determine a respective open loop power control factor for each of one or more uplink interference patterns based at least in part on respective noise power spectral density (PSD) measurements for each of the one or more uplink interference patterns, each of the one or more uplink interference patterns determined based on the received TDD configuration information, the one or more uplink interference patterns to include at least one asymmetric uplink interference pattern.

15. The apparatus of claim 14, comprising an X2 interface coupled to the processor circuit to receive the TDD configuration information from the one or more neighboring eNBs via an X2 communication channel.

16. The apparatus of claim 14, comprising a radio interface coupled to the processor circuit to communicate uplink power control information to one or more wireless devices communicatively coupled to the eNB, the uplink power control information to indicate the respective determined open loop power control factor for each of the one or more uplink interference patterns.

17. The apparatus of claim 16, the uplink power control information to cause the one or more wireless devices to adjust respective transmit power controls.

18. The apparatus of claim 14, comprising a digital display coupled to the processor circuit to present a user interface view.

\* \* \* \* \*